United States Patent [19]
Del Monte

[11] Patent Number: 5,333,816
[45] Date of Patent: Aug. 2, 1994

[54] AIRCRAFT LANDING GEAR SWIVEL LOCKING PIN HAVING AUTOMATIC RELEASE AND REENGAGE

[75] Inventor: Berardino Del Monte, Monroe, Conn.

[73] Assignee: United Technologies Corporation, Hartford, Conn.

[21] Appl. No.: 954,135

[22] Filed: Sep. 30, 1992

[51] Int. Cl.$^5$ ............................................. B64C 25/50
[52] U.S. Cl. ................................... 244/50; 244/102 R
[58] Field of Search ................. 244/50, 100 R, 102 R, 244/109; 16/35 R, 35 D

[56] References Cited

U.S. PATENT DOCUMENTS

| | | | |
|---|---|---|---|
| 1,896,234 | 2/1933 | Hathorn | 244/109 |
| 2,338,572 | 1/1944 | Corwin | 244/50 |
| 3,006,579 | 10/1961 | Frederick | 244/50 |
| 3,361,390 | 1/1968 | Wilkes | 16/35 R |
| 4,155,522 | 5/1979 | Sealey | 244/102 R |

FOREIGN PATENT DOCUMENTS 549772 12/1942 United Kingdom ................. 16/350

Primary Examiner—Michael S. Huppert
Assistant Examiner—Anne E. Bidwell
Attorney, Agent, or Firm—Michael Grillo

[57] ABSTRACT

An aircraft landing locking pin (12) automatically repositions from an engage position, wherein a rotating portion (15) of the landing gear is prevented from rotating, to a released position, wherein the rotating portion if free to rotate, in response to excessive side loading on the landing gear. The locking pin comprises a spring loaded actuator (32,34,60) which urges a roller (19) of a lock pin assembly (20) in contact with a bushing (22). In response to a side loading on the landing gear in excess of a predetermined loading, the locking pin is automatically released wherein the roller is expelled from the bushing. The threshold loading is determined as a function of the spring force applied to the lock pin assembly via the actuator linkage. The locking pin automatically reengages when the lock pin assembly is aligned with the bushing.

15 Claims, 5 Drawing Sheets

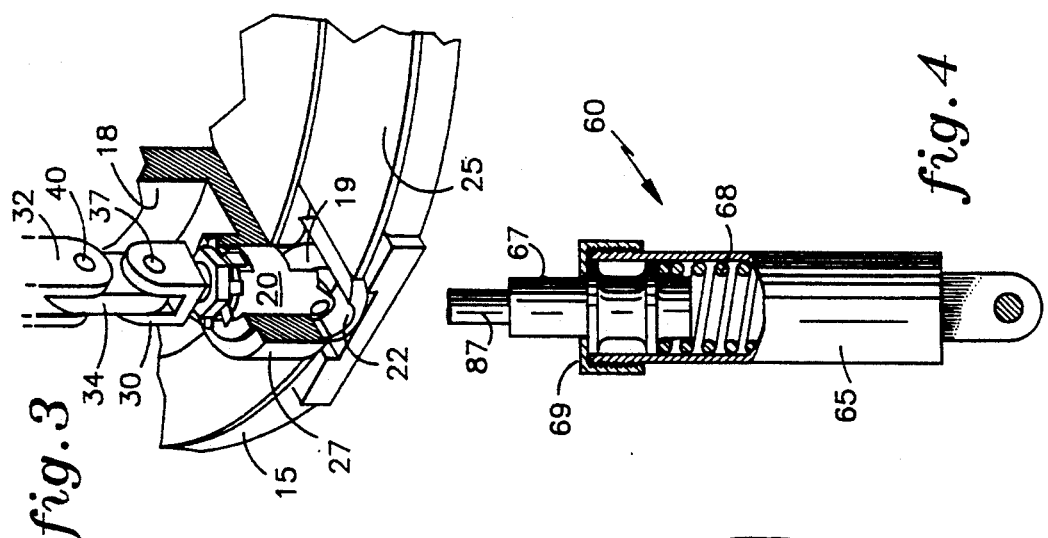
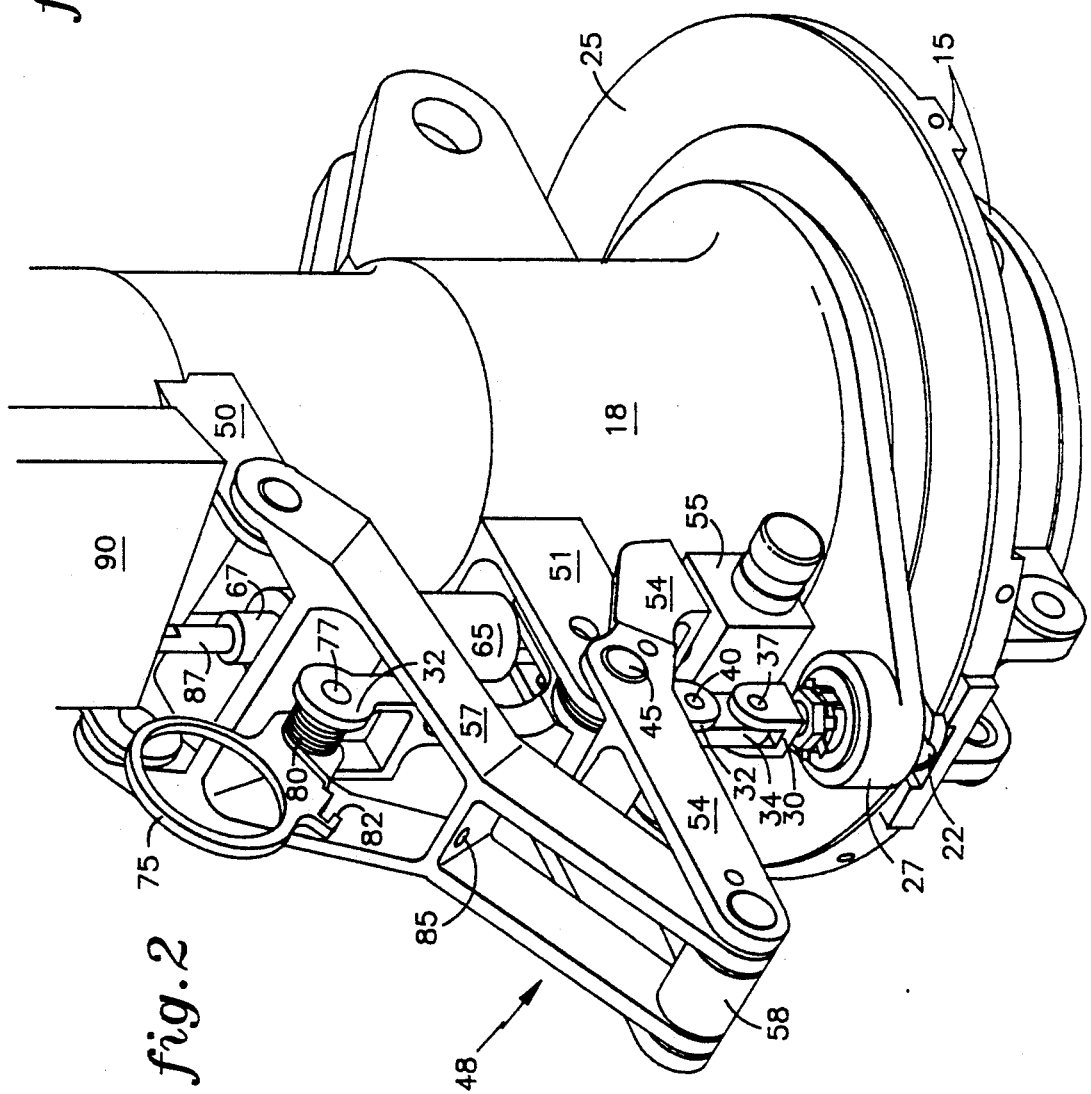

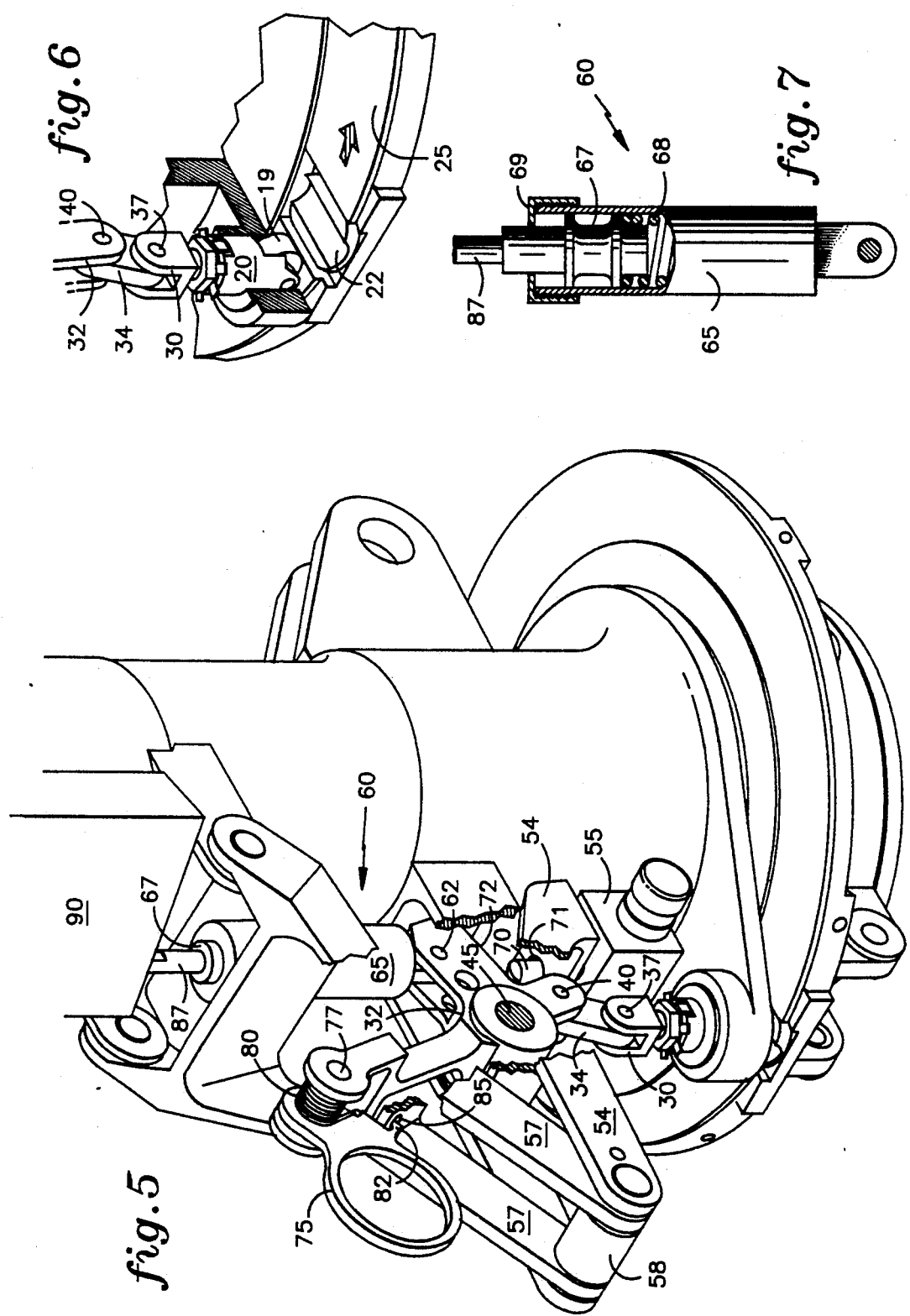

AIRCRAFT LANDING GEAR SWIVEL LOCKING PIN HAVING AUTOMATIC RELEASE AND REENGAGE

TECHNICAL FIELD

The present invention relates to aircraft landing gear, and more particularly to a releasable locking pin for aircraft landing gear having an engaged position which prevents rotation of a landing gear rotating portion and having a released position which permits rotation of the landing gear rotating portion.

BACKGROUND OF THE INVENTION

In helicopters and other vertical take-off and landing vehicles, the landing gear may comprise wheel assemblies to facilitate ground taxiing of the aircraft. One common wheel arrangement utilized for helicopter landing gear is a tripod arrangement having a main landing gear forward or aft the the aircraft center of gravity and a corresponding secondary landing gear (tail landing gear or nose landing gear) at the tail or nose of the aircraft, respectively. The main landing gear comprises two wheel assemblies on either side of the aircraft, each having an independently operable braking system, e.g., disk brakes. The secondary landing gear is mounted in a caster type arrangement such that the center axis of the wheel is offset from the center axis of the landing gear. This caster arrangement allows the wheel to rotate for easily moving the aircraft in any direction.

The secondary landing gear is also provided with a locking mechanism (shear pin) which may be manually operable or remotely operable by means of an electronic or mechanical actuator for repositioning the shear pin between a locked and unlocked position. The locking mechanism is typically maintained in the locked position with the landing gear in a fixed position orientated for aircraft forward movement. This facilitates certain ground taxiing, takeoff and landing maneuvers because side movement of the aircraft is prevented. Additionally, if the aircraft is moving rapidly, locking the wheel in the forward position helps prevent the aircraft from going into a spin if the main landing gear brakes are applied unevenly. If the secondary landing gear is retractable, the locking mechanism also holds the landing gear in the proper position for retraction. As is known in the art, retractable landing gear is typically provided with a mechanism to properly orient the rotating portion of the landing gear prior to retraction if the locking mechanism is not engaged.

Helicopter landing gear is typically provided with energy absorbing devices, such as shock struts, to absorb the vertical impact which the landing gear normally encounters in making a landing. Such energy absorbing devices are generally adequate to absorb the vertical loading on the landing gear when landing on surfaces specifically designed for aircraft landings, e.g., an aircraft landing field, helicopter pad, etc. However, because helicopters are capable of landing in almost any cleared area, caster type landing gear may encounter conditions of excessive side loading, which could occur for example when the landing gear encounters some obstruction on the landing surface, e.g., a rut, large rock, tree limb, etc. Since the shock strut is not designed to absorb the large side loading, the landing gear may be stressed beyond its design limits so that it and possibly other components of the aircraft would be damaged.

To prevent damage to the secondary landing gear caused by excessive side loading, the above-mentioned shear pins are utilized in tail and nose landing gear mechanisms. The shear pins are designed to fail under conditions of excessive side loading to prevent overstressing of certain components of the aircraft and diminish the impact which is ultimately transmitted to the aircraft. Upon failure of the shear pin, the lower portion of the landing gear is allowed to turn freely about the axis of the shock strut, thereby permitting the wheel to become oriented such that the landing gear is no longer subject to excessive side loading. However, the ability of the shear pin to fail during landing results in the need for frequent replacement of the pins, thereby making the aircraft unavailable during the repair period.

DISCLOSURE OF THE INVENTION

Objects of the invention include provision of an improved aircraft landing gear having a releasable locking pin which automatically repositions from an engaged position, wherein a rotating portion of the landing gear is prevented from rotating, to a released position, wherein the rotating portion is free to rotate, in response to excessive side loading on the landing gear.

According to the present invention, an aircraft landing gear locking pin comprises a spring loaded actuator linkage which urges a lock pin assembly in contact with a bushing wherein the locking pin is in an engaged position for holding a rotating portion of the landing gear in fixed relationship to a non-rotating portion of the landing gear. In response to a side (lateral) loading on the landing gear in excess of a predetermined threshold loading, the locking pin is automatically released wherein the lock pin assembly is expelled from the bushing and the rotating portion is free to rotate. The threshold loading is determined as a function of the spring force applied to the lock pin assembly via the actuator linkage. The locking pin automatically reengages when the lock pin assembly is aligned with the bushing.

In further accord with the present invention, a roller is mounted on the end of the lock pin assembly for engagement with the bushing when the locking pin is in the engaged position. A wear ring is provided on the rotating portion, and the roller rides on the wear ring when the locking pin is in the released position. The roller prevent excessive wear of the lock pin assembly and minimizes wear of the bushing and wear ring in response to automatic release of the locking pin during excessive landing gear side loading.

In still further accord with the present invention, the actuator linkage is manually operable for locking the locking pin in the released position. Additionally, the actuator linkage is remotely operable for repositioning the locking pin between the engaged and released positions. When the locking pin is manually or remotely placed in the released position, the roller does not contact the wear ring during rotation of the rotating portion.

The present invention represents a significant improvement over the prior art because the locking pin is automatically repositioned to the released position in response to excessive landing gear side loading. The locking pin of the present invention does not use the shear pin of the prior art and therefore avoids the aircraft down time that is required for shear pin replacement after failure. The elimination of shear pin replacement also translates into a savings in both material and labor costs.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

FIG. 2 is an enlargement of the locking pin of FIG. 1;

FIG. 3 is a perspective view, partially broken away, of a lock pin assembly of the locking pin of FIG. 2 showing a roller of the lock pin assembly engaged with a bushing;

FIG. 4 is a perspective view, partially broken away, of a piston assembly of the locking pin of FIG. 2;

FIG. 5 is an enlargement of the locking pin of FIG. 1, partially broken away, showing the locking pin in a released position in response to manual actuation of an actuator handle assembly;

FIG. 6 is a perspective view, partially broken away, of the locking pin of FIG. 5 showing the roller riding on a wear ring;

FIG. 7 is a perspective view, partially broken away, of a piston assembly of the locking pin of FIG. 5 showing a spring being compressed within the piston;

BEST MODE FOR CARRYING OUT THE INVENTION

The locking pin of the present invention is particularly well suited for automatically repositioning from an engaged position, wherein a rotating portion of an aircraft landing gear is prevented from rotating, to a released position, wherein the rotating portion is free to rotate, in response to excessive side (lateral) loading on the landing gear.

Figure 1:
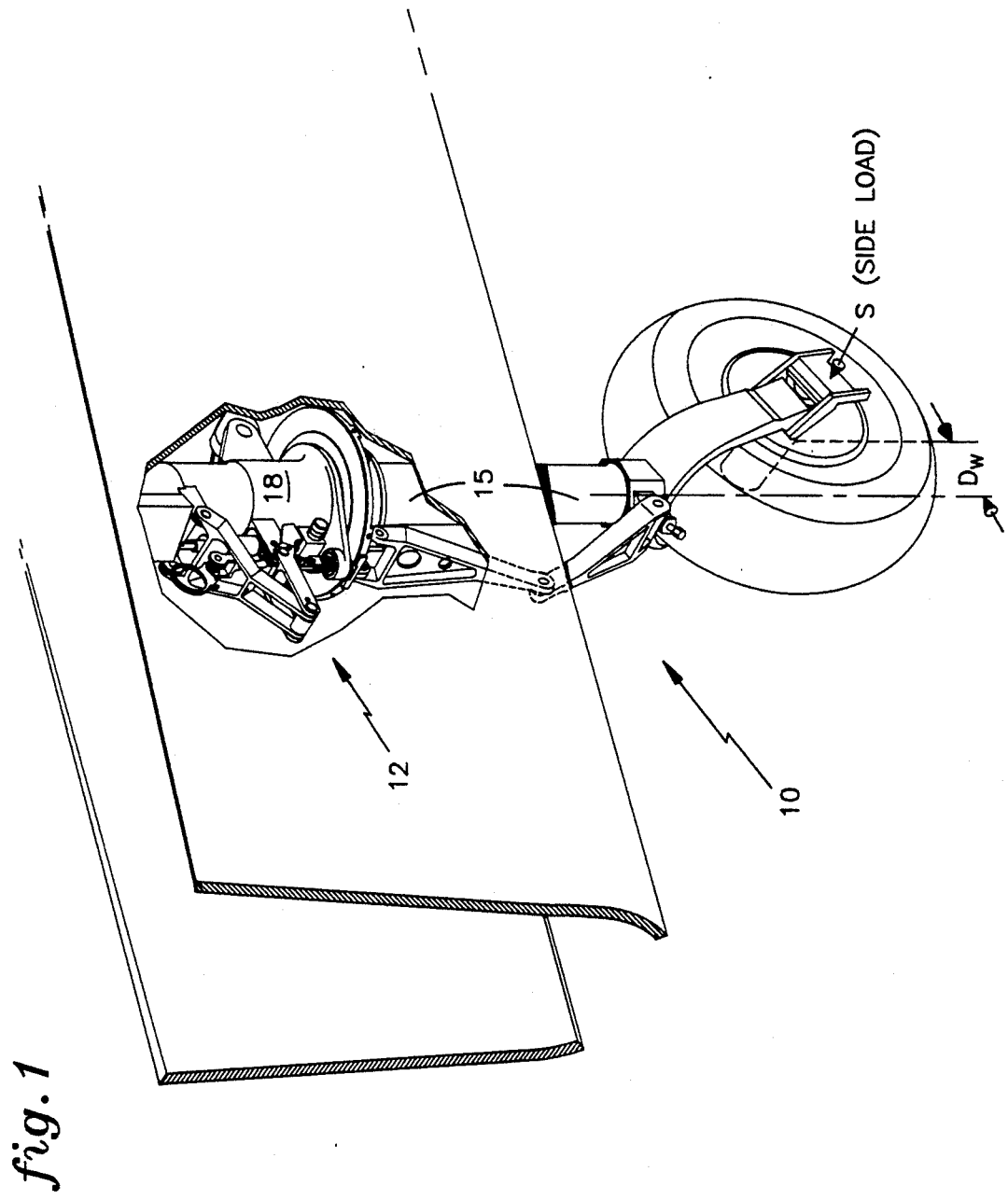
FIG. 1 is a perspective view, partially broken away, of a retractable landing gear having a locking pin of the present invention, and showing the locking pin in an engaged position.

Referring to FIG. 1, a retractable landing gear 10 is shown having a locking pin 12 of the present invention. The locking pin is shown in an engaged position such that a rotating lower portion 15 of the landing gear is held in fixed relation to an upper portion 18 of the landing gear.

FIG. 2 is an enlarged view of the locking pin of FIG. 1. Referring to FIGS. 2 and 3, the locking pin 12 is mounted to the upper portion 18 of the landing gear. When the locking pin is in the engaged position, a roller 19 (FIG. 3) mounted on an end of a lock pin assembly 20 (FIG. 3) is engaged with a bushing 22 on the lower portion 15 of the landing gear such that the lower portion is held in fixed relation to the upper portion. The lower portion is also provided with a wear ring 25 for engagement with the roller 20 when the locking pin is in the released position, as will be described in greater detail hereinafter with respect to FIGS. 5 and 6. The roller acts an an anti-friction device to minimize wear on the bushing and wear ring during contact with the roller.

The lock pin assembly 20 is mounted for slideable movement within a collar 27. The collar is attached to the upper portion 18 of the landing gear and limits the movement of the lock pin assembly to an axis parallel to the upper portion 18 and perpendicular to the plane of the wear ring 25 and the bushing 22. An end link 30 is mounted on an end of the lock pin assembly 20 opposite the roller 19. The end link is interconnected to an actuator handle assembly 32 via an idler link 34. The idler link is mounted for pivotal movement with respect to the end link 30 about the axis of a pin 37. Similarly, the idler link 34 is mounted for pivotal movement with respect to the actuator handle assembly 32 about the axis of a pin 40.

The actuator handle assembly 32 is mounted for pivotal movement about the axis of a pivot pin 45 which is supported by a support bracket assembly 48. The support bracket assembly comprises a pair of lugs 50, 51 which are machined as part of the upper portion 18 of the landing gear. A first support bracket 54 is mounted to one of the lugs 51 for supporting a locking pin position indicator 55, the function of which will be described in greater detail hereinafter with respect to FIG. 5. The lug 51 which provides a mounting for the first support bracket also supports the actuator handle assembly 32 for pivotal movement about the pivot pin 45. A second support bracket 57 is mounted between the other lug 50 and the end of the first support bracket 54 opposing the pivot pin 45. The support bracket assembly 48 is therefore mounted in fixed relation to the upper portion 18 of the landing gear. The primary function of the support bracket 48 is to mount and support a roller 58. The roller is used for contacting a cam to drive the landing gear bay doors shut upon retraction of the landing gear.

Referring now to FIG. 5, the bracket assembly 48 is shown partially broken away to thereby provide a more detailed view of the actuator handle assembly 32. The locking pin is shown in the released position in FIG. 5. As described hereinbefore with respect to FIG. 2, the handle assembly 32 is mounted for pivotal movement about the axis of a pivot pin 45. Additionally, the actuator handle assembly 32 is interconnected to the idler link 34 via a pivot pin 40. The actuator handle assembly 32 is also interconnected to a spring loaded piston assembly 60 via a pivot pin 62. The piston assembly 60 applies a downward force on the actuator handle assembly 32 at the location of pivot pin 62. This force is translated to the lock pin assembly via the idler link 34. The amount of force on the lock pin assembly is determined by the spring force of the piston assembly 60 and the mechanical advantage provided by the actuator handle assembly 32 and idler link 34, as will be described in greater detail hereinafter.

The piston assembly 60 comprises a housing 65 mounted for slideable movement along the axis of a piston 67. As shown in FIGS. 4 and 7, a spring 68 is positioned between the housing and the piston and applies a force on the housing with respect to the piston. During assembly of the piston assembly, the spring is loaded into the housing 65 and is compressed by the piston 67. An end cap 69 holds the piston in the housing 65. The spring force on the housing is in turn applied to the actuator handle assembly via the pivot pin 62. As can be seen in FIGS. 2 and 4, when the locking pin is in the engaged position, the housing 65 is fully extended with respect to the piston 67. When the locking pin is manually actuated to the released position as shown in FIG. 5, or automatically switched to the released position in response to excessive side loading, the spring 68 is compressed, and the housing 65 slides along the axis of the piston 67 (FIGS. 5 and 7).

The position of the locking pin is indicated by a position indicator 55. The position indicator comprises a switch which is actuated by a spring loaded actuator (switch plunger) 70. The position indicator 55 is mounted to the handle pivot support bracket 54, and the switch plunger 70 extends through an aperture 71 formed in the first support bracket 54. When the locking pin is in the engaged position (FIG. 2), a contacting surface 72 on the actuator handle assembly 32 contacts the switch plunger 70, and the position indicator indicates that the locking pin is in the engaged position. When the locking pin is in the released position (FIG. 5), the actuator handle assembly 32 pivots about pivot pin 45 such that the contacting surface 72 no longer contacts the switch plunger 70, and the position indicator indicates that the locking pin is in the released position.

A ring handle 75, mounted for pivotal movement about the axis of pivot pin 77, is attached to the actuator handle assembly 32. The ring handle 75 is operable to manually actuate the locking pin between the engaged and released positions. In FIG. 2, the ring handle is shown in its normal position when the locking pin is in the engaged position. A spring 80 mounted on the pivot pin 77 applies a force on the ring handle to hold it in a position generally parallel to an axis defined by the pivot pins 77 and 40. Referring again to FIG. 5, an operator may apply a force to the ring handle 75 to cause the actuator handle assembly to pivot about the pivot pin 45, thereby causing the locking pin to release. The locking pin can be held in the released position by engagement of a ring handle locking member 82 with the sides of an aperture 85 formed in the second support bracket 57. When the locking pin is held in the released position by the ring handle locking member, the lock pin assembly is retracted far enough within the collar such that the roller 19 does not contact the wear ring during rotation of the landing gear lower portion 15 with respect to the upper portion 18. Referring to FIG. 6, when the ring handle locking member is no longer engaged with the support bracket aperture 85, the roller 19 engages the wear ring 25, and the locking pin thereafter assumes the engaged position when the lower portion of the landing gear rotates such that the lock pin assembly 20 is aligned with the bushing 22 (FIG. 3).

Figure 8:
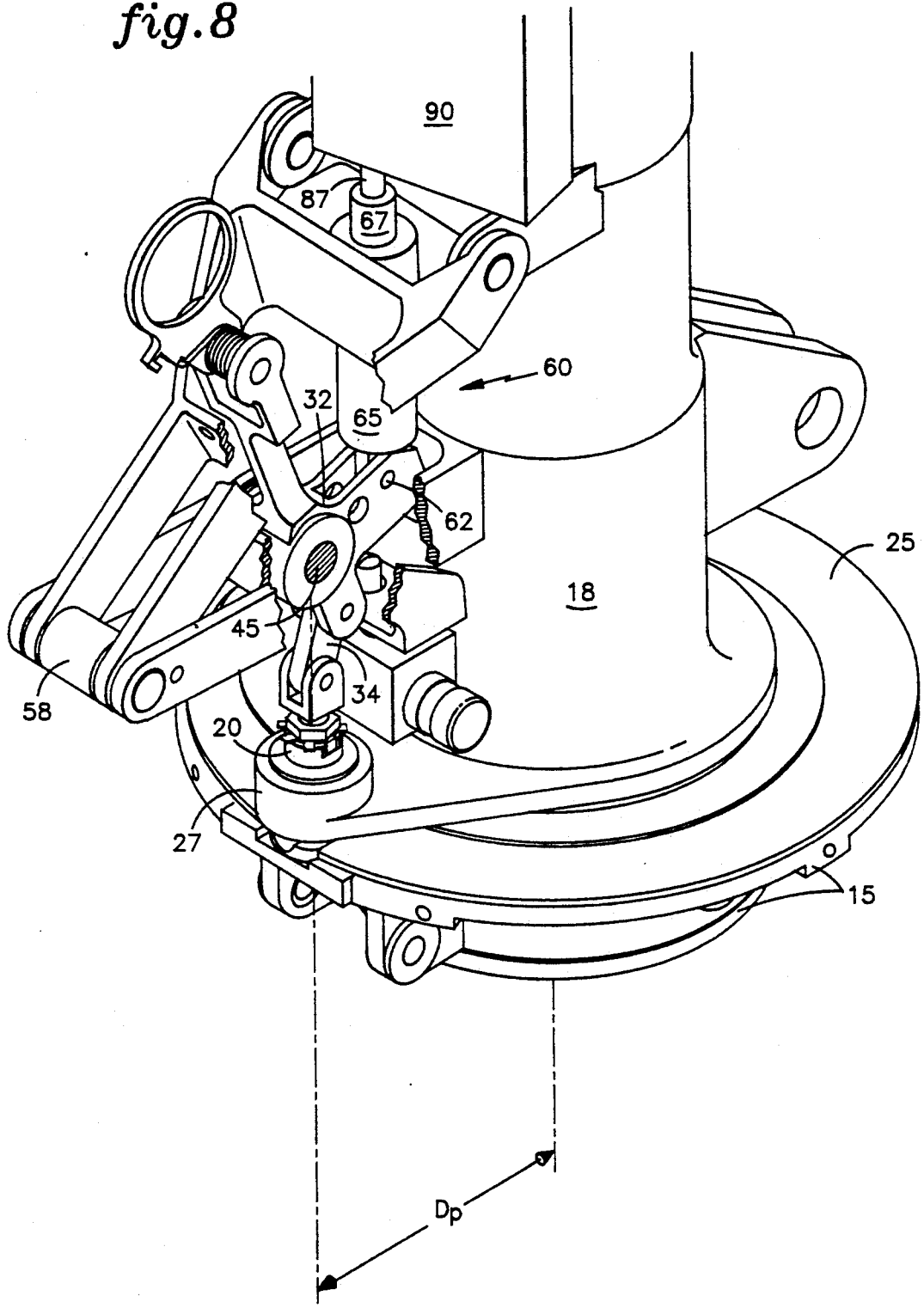
FIG. 8 is an enlargement of the locking pin of FIG. 1, partially broken away, showing the locking pin in a released position in response to remote actuation.

The locking pin may also be remotely actuated between the engaged and released positions. Referring to FIG. 8, the piston assembly 60 piston 67 is interconnected to a shaft 87 of a gear drive mechanism 90. The gear drive mechanism 90 is controlled from a remote location on the aircraft such as a pilot actuatable switch in the cockpit. When the remote actuator is in the engaged position, the shaft 87 is fully extended from the gear drive mechanism 90 as shown in FIGS. 2 and 5. When the remote actuator is in this condition, the locking pin may be released manually using the ring handle 75, or released automatically in response to excessive side loading as will be described hereinafter. When the remote actuator is in the released position, the gear drive mechanism 90 operates to to retract the shaft 87 as shown in FIG. 8. When the shaft is retracted, the piston assembly 60 is also retracted and an upward force is applied to the actuator handle assembly 32 at the pin 62. This causes the actuator handle assembly to pivot about the pivot pin 45, thereby applying an upward force on the lock pin assembly 20 via idler link 34, and releasing the locking pin.

When the locking pin is held in the released position by the gear drive mechanism 90, the lock pin assembly 20 is retracted far enough within the collar 27 such that the roller 19 does not contact the wear ring 25 during rotation of the landing gear lower portion 15 with respect to the upper portion 18. When the gear drive mechanism is no longer in the release position, and the shaft 87 and piston assembly 60 are repositioned to apply a downward force on the actuator handle assembly 32, and the roller 19 engages the wear ring 25 (FIG. 6). The locking pin thereafter assumes the engaged position when the lower portion of the landing gear 15 rotates such that the lock pin assembly 20 is aligned with the bushing 22 (FIG. 3).

As described briefly hereinbefore, the locking pin automatically repositions from the engaged position to the released position in response to side (lateral) loading on the landing gear lower portion in excess of a threshold loading. The magnitude of the threshold loading is determined by the piston assembly spring force; the mechanical advantage provided by the actuator handle assembly, idler link and lock pin assembly end link; and the angle of the bushing surface ($\alpha$) which contacts the roller. The bushing surface angle ($\alpha$) is measured with respect to the horizontal surface through which the side forces act on the landing gear rotating portion.

Figure 9:
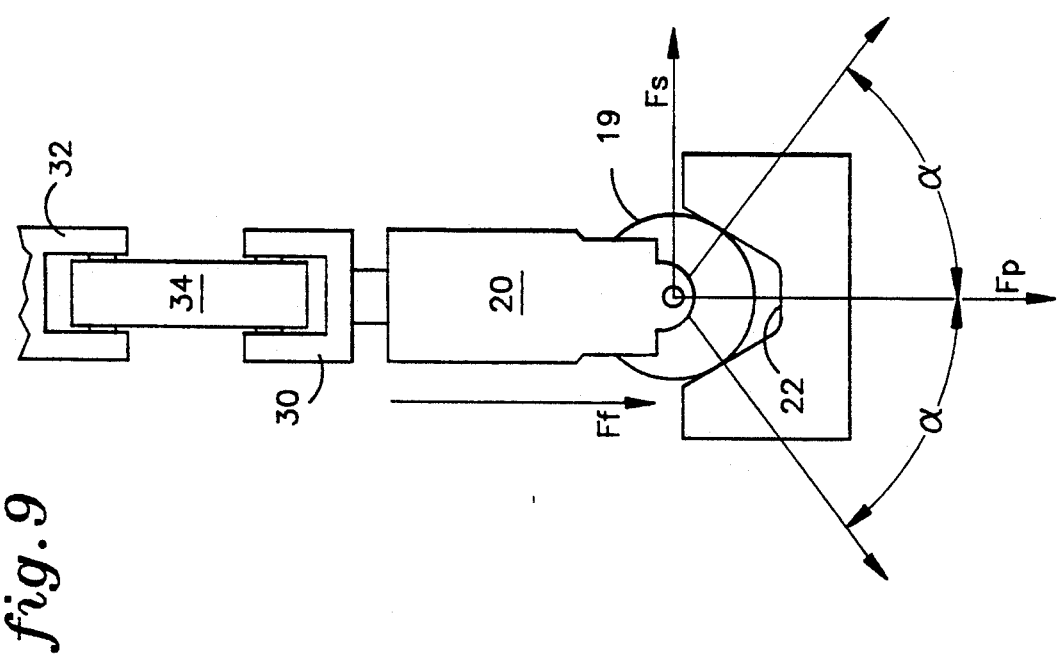
FIG. 9 is a side view of the locking pin in the engaged position showing the side force (Fs), pin force (Fp) and friction force (Ff) vectors.

Referring now to FIG. 9, when a side load (S) (FIG. 1) is applied to the landing gear wheel, a portion of that side load (Fs) is applied to the lock pin assembly. The side load on the lock pin assembly is determined by multiplying the landing gear side load by the ratio of the distance between the landing gear center axis and the wheel center axis (Dw) (FIG. 1) to the distance between the landing gear center axis and the lock pin assembly center axis (Dp) (FIG. 8). Fs is given by equation 1 below:

$$Fs = S*(Dw/Dp) \qquad \text{(eq. 1)}$$

The side force acting on the pin is in the horizontal plane, and a portion of the pin force (Fp) and friction force (Ff) apply an opposing force to the bushing surface via the roller. These force vectors are shown graphically in FIG. 9. The relationship between Fs, Fp and Ff is given by equation 2 below:

$$Fs = (Fp + Ff) * \tan(\alpha) \qquad \text{(eq. 2)}$$

Given that the friction force is equal to the side force times the coefficient of friction ($\mu$), equation 2 can be rewritten as equation 3 below:

$$Fp = [Fs - (\mu * Fs) * \tan(\alpha)] / \tan(\alpha) \qquad \text{(eq. 3)}$$

Therefore, it will be understood that if the locking pin must automatically disengage in response to side loadings in excess of a threshold magnitude ($Fs_{th}$) to prevent damage to the landing gear, the pin force must be less than or equal to a threshold pin force ($Fp_{th}$) given by equation 4 below:

$$Fp_{th} \leq [Fs_{th} - (\mu^* Fs_{th})^* \tan(\alpha)]/\tan(\alpha) \quad \text{(eq. 4)}$$

Figure 10B:
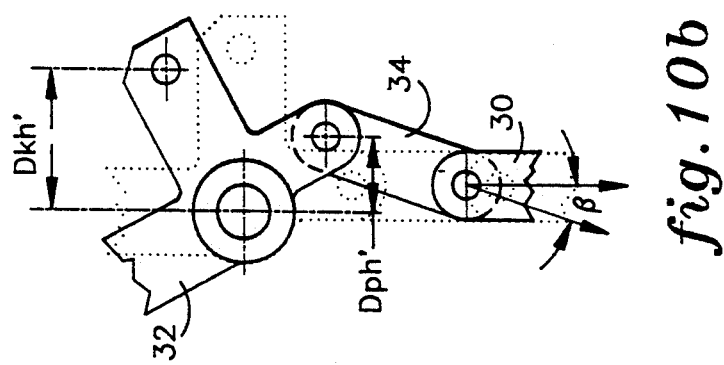
FIG. 10b is a side view of the locking pin actuating linkage in the released position, the engaged position being shown in phantom.
Figure 10A:
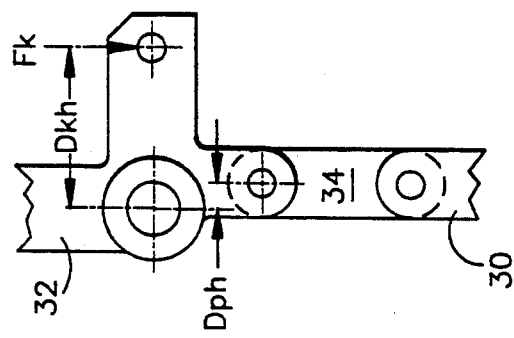
FIG. 10a is a side view of the locking pin actuating linkage in the engaged position.

Referring to FIG. 10a, the pin force provided by the spring via the actuator handle assembly is determined by multiplicity the spring force (Fk) times the ratio of the distance between the center of the spring pivot and the center of the actuator handle assembly pivot (Dkh) to the distance between the center of the idler link upper pivot and the center of the actuator handle assembly pivot (Dph). The required threshold spring force ($Fk_{th}$) necessary to provide the required threshold pin force ($Fp_{th}$) is therefore given by equation 5 below:

$$Fk_{th} = Fp_{th}{}^*(Dph/Dkh) \quad \text{(eq. 5)}$$

When the spring is compressed in response to automatic release of the locking pin, the spring force is increase by an amount equal to the spring deflection ($\delta$) times the spring constant (k). Referring to FIG. 10b, the configuration of the actuator handle assembly changes when the locking pin is released, i.e., Dkh', Dph', and therefore the amount of spring force applied to the lock pin assembly changes. The force applied to the lock pin assembly when when in the release position (Fp') is given by equation 6 below:

$$Fp' = [Fk + (\delta^* k)]^*[Dph'/Dkh']^* [\cos(\beta)] \quad \text{(eq. 6)}$$

where Dkh' is the distance between the center of the spring pivot and the center of the actuator handle assembly pivot in the released position, Dph' is the distance between the center of the idler link upper pivot and the center of the actuator handle assembly pivot in the release position, and $\beta$ is the angle of the idler link 34 with respect to vertical.

Because the wear ring will be subject to the force of the lock pin assembly roller during automatic release of the locking pin, it should be made of a suitably strong and wear resistant material, such as aluminum-bronze. When determining the spring force necessary for the piston assembly, it is desirable to select a suitably high spring force to prevent unnecessary automatic release of the locking pin, while ensuring that the spring force is low enough to prevent excessive side loading on the landing gear and excessive wear on the wear ring and bushing.

Although the invention is illustrated with a lock pin assembly having a roller for engagement with the bushing and wear ring, the invention will work equally as well with other suitable end fittings which minimize the friction between the lock pin assembly and bearing or wear ring, such as a press fit bearing. The invention is illustrated with a gear drive type remote actuator for remote operation of the locking pin; however, the invention will work equally well with any suitable actuator such as a solenoid operated actuator, pneumatic or hydraulic actuator, etc.

The invention is illustrated as using a piston assembly for applying a spring force to the lock pin assembly via the handle assembly; however, any suitable device for applying a resilient or elastic type force to the actuator handle may be used without departing from the spirit and scope of the present invention. In the embodiment of the invention illustrated herein, the spring applying the force to the actuator handle is under compression; however, as would be obvious to those skilled in the art, a spring could be oriented with respect to the handle to apply the appropriate force in response to the spring being stretched.

The lock pin assembly of the present invention provides the unique advantage of automatically releasing in response to excessive side loading, and does not require the manual or remote actuation described herein to provide that automatic release. Depending on the intended use of the aircraft, it may be desirable to provide the locking pin with only automatic release, or automatic release in combination with either manual or remote actuation capabilities. The lock pin assembly is shown mounted to the upper portion of the aircraft landing gear for engagement with a bushing or wear ring mounted to the lower rotating portion; however, it will be obvious to those skilled in the art that the invention will work equally as well with the locking pin mounted on the landing gear lower portion and the wear ring and bushing mounted to the upper portion. The positioning of the locking pin, bushing and wear ring will be determined by space requirements and specific design details and choices used in designing the aircraft landing gear. Similarly, the support bracket assembly provides a mounting location for the position indicator, and an aperture for engagement with the ring handle locking member for manually locking the locking pin in the released position. However, the primary function of the support bracket assembly is to support the landing gear door mechanism roller 58, and in the event that the locking pin of the present invention is not used with a retractable landing gear, the support bracket assembly is not necessary to practice the present invention. In such a case, other suitable means may be employed to support the position indicator and to provide a location for engagement of the ring handle locking member.

Although the invention has been shown and described with respect to exemplary embodiments thereof, it should be understood by those skilled in the art that the foregoing and other changes, omissions and additions may be made therein and thereto without departing from the spirit and scope of the present invention.

I claim:

1. A locking pin for an aircraft landing gear, the landing gear having an upper portion and a lower portion mounted to said upper portion, said lower portion being mounted for rotation with respect to said upper portion, said locking pin comprising:

a bushing adapted to be mounted to one of said portions;

a lock pin assembly adapted to be mounted to the other of said portion, said assembly having a bushing engaging member mounted thereto for engagement with said busing, said lower portion adapted to being held in fixed relation to said upper portion in response to said locking pin being in an engaged position wherein said member is engaged with said bushing, said lower portion adapted to being free to rotate with respect to said upper portion in response to said locking pin being in a released position wherein said member is not engaged with said bushing;

actuator means for applying a force to said lock pin assembly for urging said member in contract with said bushing;

said locking pin automatically repositioning from said engaged position to said released position in response to a lateral force applied to said lower portion in excess of a threshold force, the magnitude of said threshold force being related to said actuator means force applied to said lock pin assembly, and a wear ring for engagement with said busing engaging member in response to the automatic repositioning of said locking pin from said engaged position to said released position.

2. A locking pin according to claim 1 wherein said actuator means comprises:

a handle assembly operatively connected to said lock pin assembly; and resilient mean for applying a spring force to said handle assembly, said handle assembly applying a force to said lock pin assembly for urging said member in contact with said bushing in response to said spring force.

3. A locking pin according to claim 2 wherein said handle assembly comprises:

a handle mounted for pivotal movement about a handle pivot axis, said resilient means being pivotally mounted to said handle at a spring pivot axis for applying said spring force to said handle;

an end link mounted to an end of said lock pin assembly opposite said bushing engagement member; and an idler link interconnected to said handle at a first pivot axis and interconnected to said end link at a second pivot axis.

4. A locking pin according to claim 3 wherein a first distance is defined as the lateral distance between said handle pivot axis and said spring pivot axis;

a second distance is defined as the lateral distance between said handle pivot axis and said first pivot axis; and said force applied to said lock pin assembly being given by the product of said spring force and the ratio of said first distance to said second distance.

5. A locking pin according to claim 1 wherein said bushing engaging member comprises an anti-friction device for minimizing wear of said bushing and said wear ring.

6. A locking pin according to claim 1 wherein said bushing comprises a contacting surface which contacts said bushing engaging member when said locking pin is in said engaged position, said contacting surface being positioned at an angle ($\alpha$) with respect to the plane in which lateral forces act on said lower portion, said threshold force being further related to the magnitude of said angle ($\alpha$).

7. A locking pin according to claim i further comprising:

a manual actuator for manually repositioning said locking pin between said engaged and said released positions; and means for locking said manual actuator for holding said locking pan in said released position.

8. A locking pin according to claim i further comprising means for repositioning said locking pin between said engaged and said released positions from a remote location.

9. A locking pin for an aircraft landing gear, the landing gear having an upper portion and a lower portion mounted to said upper portion, said lower portion being mounted for rotation with respect to said upper portion, said locking pin comprising:

a bushing to be mounted to one of said portions;

a lock pin assembly adapted to be mounted to the other of said portions, said assembly having an anti-friction member mounted thereto for engagement with said bushing, said lower portion adapted to being held in fixed relation to said upper portion in response to said locking pin being in an engaged position wherein said member is engaged with said bushing, said lower portion adapted to being free to rotate with respect to said upper portion in response to said locking pin being in a released position wherein said member is not engaged with said bushing;

a handle assembly operatively connected to said lock pin assembly and having an operator engageable handle for local operation of said lock pin assembly;

resilient means for applying a spring force to said handle assembly, said handle assembly applying a force to said lock pin assembly for urging said member in contact with said bushing in response to said spring force, said handle assembly repositioning said lock pin assembly to said released position in response to force being applied to said operator engageable handle;

a gear drive mechanism connected to said lock pin assembly and responsive to signals provided by a pilot actuatable switch for positioning said lock pin assembly between said engaged position and said released position, and said locking pin automatically repositioning from said engaged position to said released position in response to a lateral force applied to said lower portion in excess of a threshold force, the magnitude of said threshold force being related to said actuator means force applied to said lock pin assembly.

10. A locking pin according to claim 9 further comprising a wear ring for engagement with said anti-friction member in response to the automatic repositioning of said locking pin from said engaged position to said released position.

11. A locking pin according to claim 10 wherein said anti-friction member is a roller for minimizing wear of said bushing and said wear ring.

12. A locking pin according to claim 9 wherein said bushing comprises a contacting surface which contacts said anti-friction member when said locking pin is in said engaged position, said contacting surface being positioned at an angle ($\alpha$) with respect to the plane in which lateral forces act on said lower portion, said threshold force being further related to the magnitude of said angle ($\alpha$).

13. A locking pin according to claim 9 further comprising means for locking said handle assembly for holding said locking pin in said released position.

14. A locking pin according to claim 9 wherein said handle assembly comprises:

a handle mounted for pivotal movement about a handle pivot axis, said resilient means being pivotally mounted to said handle at a spring pivot axis for applying said spring force to said handle;

an end link mounted to an end of said lock pin assembly opposite said anti-friction member; and an idler link interconnected to said handle at a first-pivot axis and interconnected to said end link at a second pivot axis.

15. A locking pin according to claim 14 wherein a first distance is defined as the lateral distance between said handle pivot axis and said spring pivot axis;

a second distance is defined as the lateral distance between said handle pivot axis and said first pivot axis; and said force applied to said lock pin assembly by said handle assembly being given by the product of said spring force and the ratio of said first distance to said second distance.

* * * * *